United States Patent

[15] 3,660,671

Peterson

[45] May 2, 1972

[54] ELECTRIC POWER TAKEOFF SYSTEM

[72] Inventor: Edwin R. Peterson, 3109 Bogus Basin Rd., Boise, Idaho 83702

[22] Filed: July 20, 1970

[21] Appl. No.: 56,546

Related U.S. Application Data

[63] Continuation-in-part of Ser. No. 8,853, Feb. 5, 1970.

[52] U.S. Cl. .................................290/1, 307/10, 290/40, 290/50
[51] Int. Cl. .......................................................H02p 9/04
[58] Field of Search ..............307/10, 66, 64, 155; 322/38, 322/15, 14; 320/39, 40; 290/40, 1, 50

[56] References Cited

UNITED STATES PATENTS

| | | | |
|---|---|---|---|
| 3,456,119 | 7/1969 | Schneider | 307/10 |
| 2,908,827 | 10/1959 | Hickman | 307/10 |
| 3,127,518 | 3/1964 | Pruitt | 307/10 X |
| 3,293,443 | 12/1966 | Burch | 307/10 X |
| 3,316,473 | 4/1967 | Pruitt | 307/10 X |
| 3,471,706 | 10/1969 | Schneider | 307/10 |
| 3,497,709 | 2/1970 | Chilton et al. | 307/10 |

*Primary Examiner*—G. R. Simmons
*Attorney*—J. Gibson Semmes

[57] ABSTRACT

An electric power takeoff system for operative association with electric output devices such as alternators or generators driven by an engine such as providing motive power for vehicles of different types, stationary engines and other types of power plant apparatus. The electric power takeoff system operates to provide operating power for operating electrical appliances, battery charging and welding attachments, directly therefrom, the appliances and attachments operating on DC current in voltage ranges from 1 to 220 volts DC. The system includes a means of adjusting electric output by changing the rpm of the engine driving the alternator, so as to match voltage requirement on appliances being operated, or combination thereof, the functions being performed through the system and automatically operable upon actuation of an appliance switch when connected into the system and engine speed, and therefore electric power output, will be automatically established upon actuation of the appliance. The system includes an automatic, electromagnetic working solenoid functioning to increase engine speed and also change circuitry to provide a fail safe system to preclude endangering an alternator, regulator or electrical system associated with the engine. A fail safe circuitry is provided to accommodate operating the system for battery charging in voltage ranges of 1–220 volts DC and polarity protection is incorporated within the on-off switch circuitry in the event of improper hookup to a battery being charged. The system also incorporates a safe and simple hook-up feature for quick association with a vehicle system incorporating such an engine providing pre-assembled and connected wiring.

10 Claims, 4 Drawing Figures

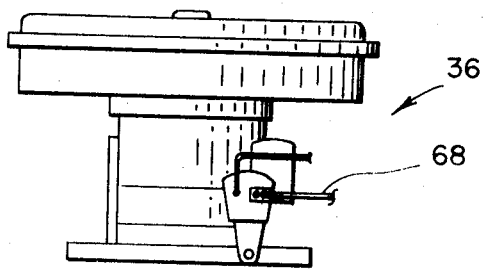
FIG. 2
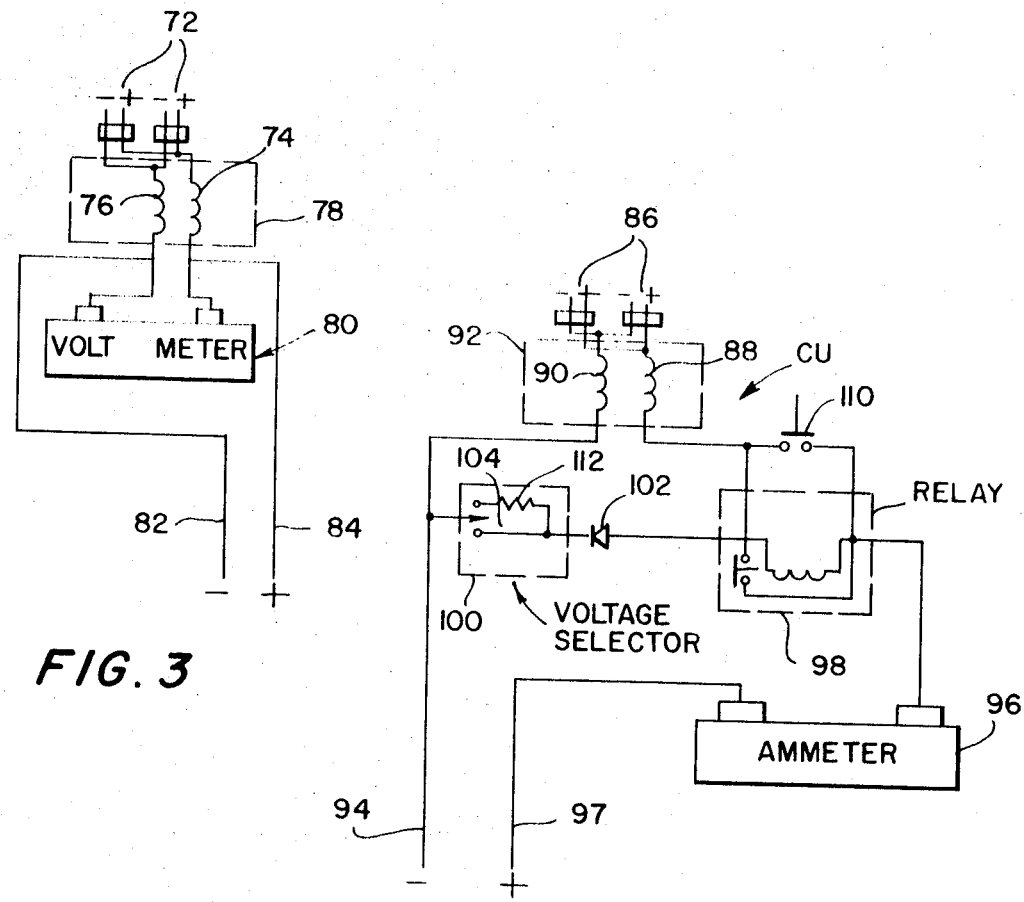
FIG. 3
FIG. 4
INVENTOR
EDWIN R. PETERSON
BY J. Gibson Semmes
ATTORNEY

ELECTRIC POWER TAKEOFF SYSTEM

A system for apparatus incorporating various basic concepts of the invention is shown in my prior pending patent application entitled: Vehicle Electric Power Takeoff System, Ser. No. 8,853, filed Feb. 5, 1970, of which the present application is a continuation-in-part, and incorporates improvements over the aforesaid basic concepts.

BACKGROUND OF THE INVENTION

A need exists whereby an electrical appliance, or electrical operation, in the nature of, for example, drills, saws, lights, welding appliances, battery charging, etc., can be connected to and operated directly from an electrical system associated with an engine such as vehicle motive engine or stationary engine serving to drive an alternator or generator. The engine can consist of, for example, an individual gas engine, diesel engine, electrical motor, or air cooled engine, and in which a DC power supply can be automatically connected to the appliance, or operation, while at the same time providing simplicity of construction and association with, for example, a vehicle or an engine and the system in operation must provide safeguards to prevent damage to the electrical system or components thereof. A need exists whereby electrical operations or electrical appliances, battery charging, welding and/or combination of these functions are available from a vehicle or engine alternator or generator automatically.

Heretofore, such a system and apparatus have not been available on a practical and commercially feasible level from a single unit.

SUMMARY OF THE INVENTION

The invention provides a system for association with a vehicle or other engine alternator or generator to operate DC appliances, or functions, in the nature of saws, lights, battery charging, welding, etc. operated by merely controlling the switch on the appliance. With an engine idling, a DC appliance or battery charge unit can be operated by connecting it into, for example, a 110 volt DC receptacle in the switch system and switching the appliance arm. Connecting a welding unit into 110 volt DC receptacle and striking a welding rod on work will actuate the system and the welding arc will commence. The system includes means to automatically speed up the engine to a preset speed and the alternator or the like will generate a predetermined and preset DC voltage necessary to operate the appliance, battery charging or welding, etc. An automatic fail safe system is provided to prevent damage to the alternator, regulator or vehicle electrical system. The system, upon connection of the appliance and actuation thereof, is completely automatic in the absence of additional controls other than that of the appliance. In operation, the system acts to disconnect an alternator or the like from a vehicle or other engine battery and connect it into a DC outlet in which an appliance is connected.

The system also permits actuating of a battery charge unit from a completely dead battery by incorporating for actuation a dead battery switch to bypass a polarity protecting circuitry. A fail safe circuitry accommodates operating a welding unit from the system which allows dead shorting of the welding electrode to the work to actuate a system without endangering the system, alternator or electrical system of an engine or vehicle with which associated. The system is capable of actuating by relay and welding electrode and necessary circuitry. The system when operating with a welding unit provides necessary circuitry to allow an alternator or the like to weld, braze, heliarc, production weld, mild steel, stainless steel, aluminum, ferrous and non-ferrous metals. The size of welding rod the system is capable of burning, depending upon the alternator size on which the system and weld unit are attached, operable units being, for example, a 50 ampere automobile alternator with standard 60 ampere, 2,400 watt electric power takeoff system and welding unit will burn ⅜ inch rod. A 100 ampere alternator and heavy duty takeoff system and heavy duty weld system can burn 3/16 to ¼ inch rod.

Additional objects and advantages of the present invention will be more readily apparent from the following detailed description of embodiments thereof, when taken together with the accompanying drawings in which:

FIG. 2 is a schematic representation of adjustable connecting means to an engine speed control system;

FIG. 3 is a circuit schematic of a weld unit for use with the electric power takeoff system; and FIG. 4 is a circuit schematic of a battery charging unit for operation with the electric power takeoff system.

Figure 1:
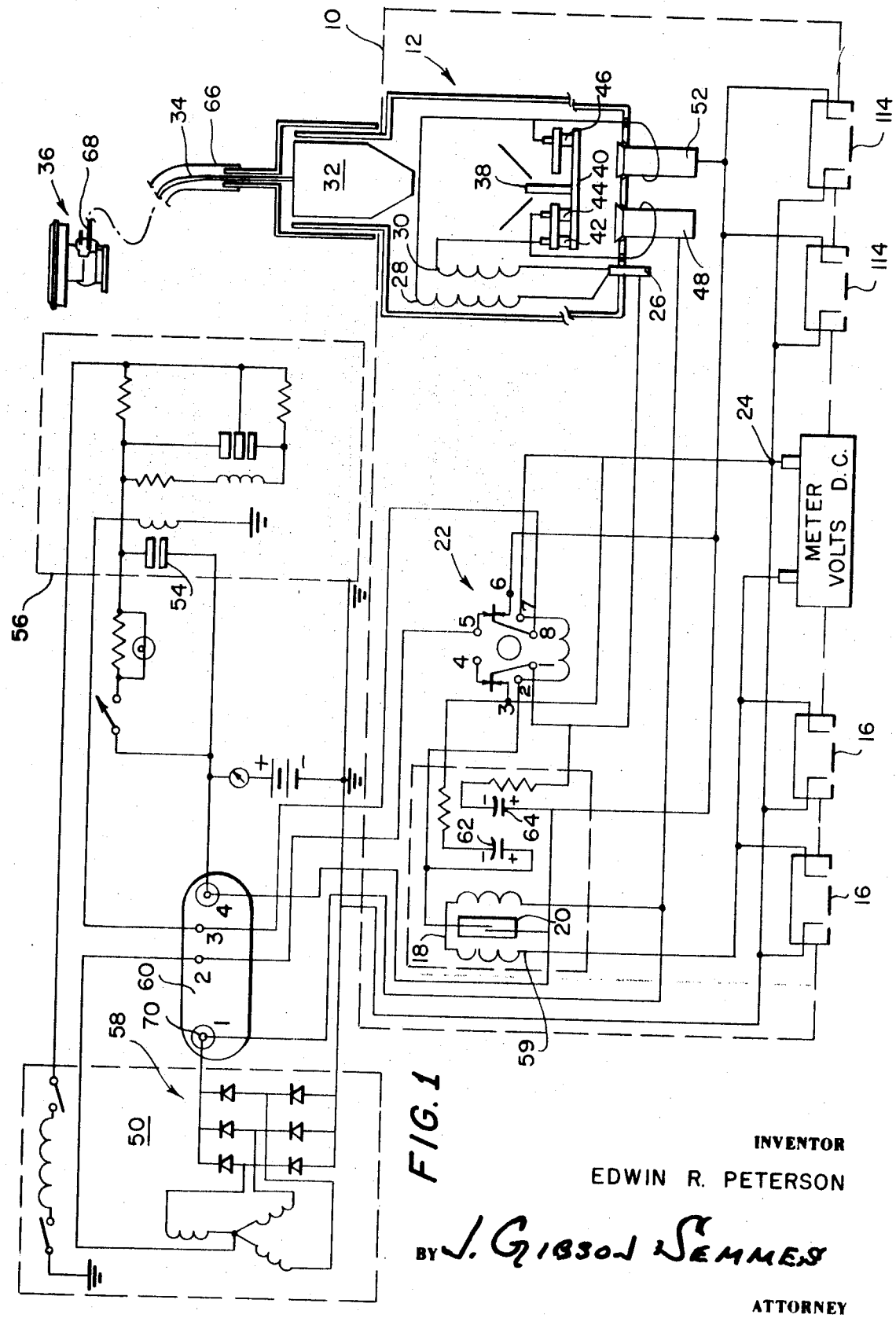
FIG. 1 is a schematic electromechanical diagram of the system of the present invention.

In FIG. 1 of the drawings, various components of a vehicle, stationary or other engine control system are schematically depicted, and the interconnected electrical components and circuits are schematically shown in operative association and connection therewith. The shown embodiment is a single preferred embodiment, but manifestly, principles of association with and operation in conjunction with any engine can be varied or modified within the teachings of the invention. The system will be described in conjunction with a vehicle engine for illustrative purposes only and obvious use of the system as applied to different engines and engine settings will be apparent to those skilled in the art.

Basically, the function and purpose of the invention which might be aptly termed a Kwik Power Pack, relates to operating 110 volts DC, or other appliances, drills, saws, lights, Kwik Charge and Kwik Weld attachments, etc., directly from any vehicle alternator or generator automatically solely on actuating a switch on the appliance. No additional switches or hand throttles or the like are required. With the vehicle engine idling, any DC appliance can be operated by plugging it into a 110 volt DC receptacle and switching the appliance on. The engine will automatically speed up to a pre-set r.p.m., and the alternator functions to generate 110 volt DC power, or any preset amount, necessary to operate the appliance. The system incorporates an automatic fail safe so as not to endanger the alternator, regulator, or vehicle electrical system. The appliance can be easily and quickly connected directly into an output plug in a box or receptacle, and the system will also operate satisfactorily through extension cords of varying lengths. The system is completely automatic, and with the engine idling, squeezing or actuating the trigger of a tool or appliance plugged into the system will serve to automatically actuate the system and appliance.

The present system consists essentially of a box 10 and solenoid 12 and is so constructed, wired, and wound with a combination of, for example, magnetic reed switches, coils, contacts, meters, 110 volt DC plugs, 12 volt plugs, depending upon the model, and flexible cable whereby units which are pre-wired permit hooking up to the alternator, accelerator, accelerator linkage, and generally associated with the vehicle in a simple manner which prevents an incorrect connection when installed on a proper model vehicle with compatible voltage and polarity. Certain components and areas, as shown within dotted line 14, are encapsulated in a heat sink with an epoxy containing a high amount of metal in suspension giving excellent thermal conductivity. This feature allows the Kwik Power Pack to be safe when accidentally dead shorted for a considerable length of time without damage. This feature makes the welding operation possible because it prevents damage when a welding rod is shorted on work to actuate the circuit and strike the arc. The system or power pack as shown changes or converts the Kwik Hook-up or wiring diagram to an alternator to allow it to generate 110 volts DC, or others.

With reference to the wiring diagram as shown the circuitry connection makes a 12 volt DC potential voltage across 110 volt plug-ins, or outlet receptacles, 16. Upon plugging in a 110 volt DC appliance into either of these plug-ins, the resultant resistive load will create a closed circuit across coil 18, and amperage will flow through the coil. The amperage flowing through coil 18 will create magnetic lines of force which will actuate a magnetic reed switch 20. As schematically shown, the aforesaid elements and others incorporated in the unit are associated with or contained in box or receptacle 10, adapted for operative association with a vehicle and engine thereof.

Upon actuation of the switch 20, the electrical sequence to accomplish the function of the unit is initiated.

The magnetic reed switch 20 is connected to a double pole, double throw relay generally indicated at 22, by attachment to terminal 2, of a plurality of terminals electrically incorporated in the relay, the terminals being designated as 1, 2, 3, 4, 5, 6, 7 and 8. The amperage flows through an actuating coil of relay 22, out through terminal 7 and into ground, as at 24. Through a combination of contacts in relay 22, the following functions are accomplished. Terminal 1, through the relay at rest is connected to terminal 4. When the relay is actuated, terminal 1 breaks contact with terminal 4 and remakes contact with terminal 3, placing terminal 1 to ground since terminal 3 is grounded. Terminal 1 of relay 22 is connected to relay terminal 26 of solenoid 12. In the system and diagram as shown, there is voltage potential on the other end of the solenoid actuating coils 28 and 30. Therefore, relay terminal 26 is put to ground to complete a circuit through the coils. The coils 28 and 30 are energized, whereupon solenoid plunger 32 is pulled into the solenoid 12. Upon movement of solenoid plunger 32, cable 34, attached at one end to plunger 32, and at other end to an engine accelerator linkage, diagrammatically represented at 36, operates to speed up engine. As As plunger 32 travels further, it contacts point 38 of a contact push rod in the solenoid which in turn is connected to a striker plate 40 which rests on three contacts 42, 44, 46. Therefore, upon movement of plunger 32, in this manner, striker plate 40 is removed from the three contacts.

Contact 42 is a source of voltage for heavy wound pull-in coil 30 and, following the above operation, this removes the source of voltage from the pull-in coil which would otherwise burn up if energized for too long a period of time. Contact 44 is connected to the large alternator terminal 48 of solenoid 12 and consequently opens the circuit between alternator 50 and the battery of the vehicle. Contact 46 is permanently connected to battery terminal 52 of the solenoid, and when striker plate 40 moves from contact 46, it removes the voltage potential from 44. The hold-in coil 28, still has voltage potential which continues to hold the solenoid plunger in against the contact striker push rod 38 with the solenoid plunger holding the striker plate away from the contacts. The accelerator linkage 34 is held at a pre-determined setting for the required rpm to generate the 110 volt DC out of the alternator. The alternator being now disconnected from the voltage leveling capacitive character of the battery, and connected with a higher resistance of the 110 volt appliance, or operation, produces the desired voltage as determined by the rpm by which it is driven. The full voltage of the battery passing through contact 54, in the regulator 56, and into the rotor of the alternator 50 produces a flux or lines of force, that when rotated through the stator at the desired r.p.m. produces the desired voltage sufficient to induce the voltage into the stator windings. This voltage and consequent amperage flows through the six rectifying diodes 58 which changes the three phase alternator current to a DC voltage and amperage of 110 volts or as desired, leaving the output terminal of the alternator. Through the previously described circuitry of the Kwik Power unit the installation of the windings terminals of the car alternator are adequate to accommodate this higher voltage. Many hundreds of application of the Kwik Power to the automotive alternator has proven the common diode as used in the common automotive alternator to be capable of operating in the 110 volt range. Tests on the common diode applying 220 volts has shown no break down of the common diode. This affords a 100 percent effective factor.

As the solenoid plunger 32 pulls the accelerator to the proper rpm, the alternator voltage reaches 110 volts DC or some pre-determined amount as desired at outlet receptacle 16. The alternator terminal 48 is in an open circuit. Voltage continues through coil 18 to the 110 volt DC plug-ins 16 as shown in the circuitry. When the trigger of an appliance connected in the circuit is released, the circuit becomes open, and appliance amperage stops flowing through coil 18. No magnetic force then exists in magnetic reed switch 20, and it opens and the sequence reverses. The solenoid in use closes the circuit between the alternator and the battery. The system is at rest and the alternator and battery are connected in a normal manner. This then instantaneously inserts the voltage leveling capacity of the battery with the alternator removing any dangerous spikes from the system which could damage the alternator or the car electrical system.

The relay 22 further has terminal 8 in contact with terminal 5 at rest, which places the neutral terminal of the alternator into the proper terminal of the regulator through neutral wires. When relay 22 actuates terminal 8 is removed from terminal 5 and contacts with terminal 6. The wire from the neutral terminal on the alternator is then open and connects the battery to the field relay of the regulator 56. This gives the regulator 12 volts DC to pass through the normal car field wire to excite the alternator to the maximum. A further circuitry may be added to originate at point 59, utilizing a resistor or zenor circuitry with electrical specifications so as to drop the 80 to 110 volts and put voltage to 16 to 20 volts at a terminal added to a terminal block 60. By merely wrapping the field wire between the regulator and the alternator around the added terminal of the terminal block, with a proper mechanism to pierce insulation of this field wire and firmly contact the wire inside. The resulting increase in excitation voltage to the rotor will enable the alternator to produce a given voltage at a lower rpm. The field wire is not affected and remains connected to the field terminal in a normal manner.

Capacitors 62 and 64 with a 39K resistor, prevent damaging sparking on contacts of switch 20, (also diodes could be used) and contact both terminals 1 and 2 of the relay 22 as shown in the diagram. A diode of sufficient specification may be substituted for the capacitor or resistor at this point. At a position indicated at 66 on the solenoid accelerating cable, an adjusting nut 68 is placed to permit lengthening the outer casing of cable. This permits fine adjusting of the voltage level of the accelerator adjusting cable by changing the length of throw of the solenoid plunger cable and therefore changing the rpm setting of the motor. When installing the present system, the solenoid plunger cable can be attached to the accelerator linkage in a manner such as to pull the accelerator linkage to such an rpm to cause the alternator to generate a close proximation to 100 volts DC, as depicted at point 68. Depending on the general load plugged into the system, the voltage setting desired is determined. If heavy loads are used, the setting probably would be between 100 to 110 volts d.c., whereas with small loads such as with ½ or ⅜ inch drills, skill saws, a setting at 90 or possible 80 volts DC is desirable. This gives a resultant power sufficient for proper functioning because for a given voltage DC current is stronger than AC current. It should be noted in this system that if a wire break or become open, the units will obviously rest in a safe wiring condition and circuit so that the alternator is connected to the battery and cannot operate on an open circuit to burn itself up.

The wires leading to the alternator are shown connected to the Kwik Hook-up terminal block 60, which is of fiber material or the like, and the block is installed on the battery terminal 70 of the alternator after the battery wire is removed. Then the battery wire is reinstalled on the terminal 4 of the terminal block. The neutral terminal hookup will be basically the same, and again the neutral terminal wire will be reinstalled to the fiber block and accomplish the connections as shown on the wiring schematic. Further, the field coil will be merely wrapped around its appropriate terminal and the nut tightened securely provides higher excitation of the rotor.

The Kwik Charge unit (Fig. 4) is constructed with two male 110 volt plug-ins 86 assembled so as to plug simultaneously into Kwik Power Pack 110 volt female plugs-ins, 16, giving double amperage carrying capacity. Circuitry of the Kwik Charge unit is simple as shown in FIG. 4, with off-on and voltage selector switch and dead battery switch. The welding unit (Fig. 3) has same plug-in arrangement as Kwik Charge, for, as striking the arc, a relay with actuating coil across the DC output circuitry will close the contact of said relay. The contact to by-pass reed switch 20.

In both Kwik Charge and Kwik Weld unit the 110 volt male plug-ins are wired in parallel for the double amperage capacity. The wires from the units just inside the unit are made into a coil and embedded in epoxy in a heat sink. This will draw the heat from the 110 volt male plug-ins and keep them cool. The coil 18 being encapsulated in epoxy in the heat sink in the Kwik Power unit will draw the heat from female receptacles 16 and keep them cool.

The unit of the invention serves basically to disconnect the alternator from battery, vehicle or other engine, and connect it into the 110 volt DC outlets 16. The solenoid plunger 32 serves to speed up the engine to a pre-determined voltage output. Normally the alternator generates into the battery at 12 volts DC. They generally have a potential of 40 to 65 amps and, consequently, will have an output of 480 to 650 watts maximum. With unit and system functioning, the alternator speeds up and is capable of an output of 30 amps and 110 volts DC with a resultant 3,000 watts output. A claimed 2,500 watt output at maximum operating voltage results in a desirable safety margin. The Kwik Charge unit operating from the Kwik Power unit can be connected to 6, 12, 24, or 36 volt battery and the battery will receive a Kwik charge. The Kwik Weld unit plugged into the Kwik Power Pack, satisfies the circuitry to cause the alternator to produce from 20 to 40 volts DC according to the rod being used and the metal being welded. The amperage being produced is dependent upon the alternator being used and is the limiting factor on the size of rod being burned.

Installation of the system as incorporated in the Kwik Power unit in a vehicle is extremely simple, since there are no individual wires to hook-up. Everything is connected in the manufacturing, including the wires going to the alternator which are installed in the fiber block above referred to, called Kwik Hook-up terminal block. Therefore, when the unit is installed and the voltage set, an individual cannot damage the unit. The circuitry and units are wired and constructed in a manner that when dead shorting for a short period of time, the volt 110 outlets will not damage the unit or any part of the car electrical system. In operation upon plugging a 110 volt DC appliance into the 110 volt DC outlets and pulling the trigger of the appliance, there is really no way in which the unit can be damaged. All coils are used in a constant duty manner and are thusly wound. The one pull-in coil in the solenoid is merely used for pull in, and when the striker plate is removed from the contacts, it goes on an open circuit and no heat is generated. There is little or no sparking on any of the contacts, and, therefore, actuations possible with the unit are substantially unlimited.

The Kwik Weld unit WU of FIG. 3 is connected to the Kwik Power Pack by inserting the double male plug-ins 72 of the unit into receptacles 16. The male plug-ins 72 being connected in parallel lead directly into coils 74 and 76, which are encapsulated in a high metal content epoxy which is further molded into a heat sink 78. Two small wires connect coils 74 and 76, to volt meter 80. Heavy welding leads 82 and 84 continue to a normal ground welding clamp and a normal welding rod clamp, not shown. With the ground connected to the work to be welded and a proper welding rod in the rod clamp, the welding rod is scratched on the work. This scratching causes amperage to flow in coil 18 (Fig. 1), of Kwik Power Pack and begins a sequence of actuation speeding up the engine to produce a welding voltage from 20 to 40 volts. The amperage flowing will depend on the size of alternator, size of the rod, and the contents thereof. Removing the rod opens the circuit reversing the sequence, then the Kwik Power Pack is in rest position with the alternator connected to the battery.

The Kwik Charge Unit CU (Fig. 4) is connected to the Kwik Power Pack by inserting the double male plug-ins 86, of the Kwik Charge unit. The male plug-ins 86, being connected in parallel, lead directly into coils 88 and 90 which are encapsulated in a high metal content epoxy which is further molded into heat sink 92. Battery charging lead 94 is connected to coil 90 and is terminated with a battery charging clamp. Terminal of ammeter 96 is connected to the contacts of a relay 98. Battery charging lead 97 is connected to contacts of relay 98 and is terminated with a battery charging clamp. Actuating coil of relay 98 is connected to charging lead 97. The other end of actuating coil or relay 98 is connected to terminal 100 with diode 102 in series, in the 6 and 12 volt position of a single pole double throw switch 104. The same end of this actuating coil has a resistor 112, in series which is then connected to a terminal 108, in the 24 volt position of the single pole double throw switch 104. The third wire of the single pole double throw switch is connected to lead 94. The single pole double throw switch 104 is the off-on and voltage selector switch. In between coil 88 and diode 102 a normally open dead battery switch 110 is connected. The other terminal of the dead battery switch is then connected to one end of the actuating coil of relay 98. The combination of relay 98 single pole double throw switch 104 and diode 102 gives the Kwik Charge unit polarity protection in the actuating circuit against operation if the battery charging leads are incorrectly hooked to the battery to be charged.

The dead battery switch 110 will actuate the circuit from voltage of the service vehicle bypassing the diode 102. This is used when the battery to be charged has absolutely no voltage and therefore cannot actuate relay 98. Connecting the battery charging leads properly on the battery to be charged and moving switch 104 to the proper voltage will cause amperage to flow in coil 18 of the Kwik Power Pack actuating the circuit thereof to speed up the engine and connect the alternator through the Kwik Power Pack and the Kwik Charge unit to the battery to be charged.

Connecting the Kwik Charge unit into 110 volt receptacles 16 will produce an unregulated fast charge. Connecting the Kwik Charge unit into receptacles 114 and speeding the engine up manually will produce a regulated fast charge.

Manifestly, minor changes in detail, components and circuitry can be effected without departing from the spirit and scope of the invention as defined in and limited solely by the appended claims.

I claim:

1. An electrical power regulating accessory system for operating a DC electrically powered appliance off a vehicle engine with electric power generation including in circuit a regulator, an engine driven alternator including two terminals, a DC storage battery, and an engine accelerator control means and with an electromechanical circuit comprising:
   A. a first series circuit including at least one two contact electrical receptacle, said alternator, the coils of an electromagnetic reed switch means, said reed switch means operable upon closing of said series circuit;
   B. a second series circuit including the said electromagnetic reed switch, said battery, and a double-throw switch means operable upon operation of said reed switch means, one throw of said double-throw switch means upon operation completing said second series circuit and the second throw of said double-throw switch means upon operation electrically connecting said DC storage battery to a first said alternator terminal;
   C. said first alternator terminal selectively connected in series with a second alternator terminal, and an energizing coil of an electromechanical solenoid, said solenoid comprising plunger means operatively connected at one end to said engine speed control means for selective actuation thereof;
   D. a plurality of normally closed solenoid contacts associated with said solenoid, said solenoid contacts operatively disconnectable upon plunger means movement, said solenoid contacts in the closed position connecting in a third series circuit the first of said alternator terminals and the second of said alternator terminals;

whereby upon actuation of said reed switch means, said DC storage battery is disconnected from the said system and the engine speed is regulated.

2. A system as claimed in claim 1, said magnetic switch comprising a magnetic reed type, and capacitors and resistors in circuit with said switch operable to eliminate damaging sparking on contacts of said switch induced from reverse voltage from plunger hold in means for said solenoid.

3. A system as claimed in claim 2, said switch, said capacitors and said resistors being encapsulated in a heat sink including an epoxy and high content of metal in suspension for enhanced thermal conductivity for damage protection from circuit dead shorting.

4. The system as claimed in claim 1 wherein said first series circuit is closed by the insertion and switching on of an appliance plug into one of the said two contact electrical receptacles.

5. The system as claimed in claim 1 wherein upon opening of said first series circuit, said plunger means return said solenoid contacts to original closed position.

6. A system as claimed in claim 1, further comprising rectifying diodes electrically associated with said alternator whereby alternating current is converted to direct current for transmission to said receptacle during appliance use.

7. A system as claimed in claim 6, and further including two receptacles, said receptacles being adapted for simultaneous connection to a battery charge unit for double amperage carrying capacity, said receptacles having the wiring thereof in the form of a coil embedded in epoxy in a heat sink in an appliance connector to draw heat from said outlets for cooling thereof.

8. A system as claimed in claim 7, said appliance constituting an electric weld unit, said circuit including by-pass means for said reed switch whereby upon striking an arc, a relay with actuating coil across the DC output circuitry will close the contact of said relay and by-pass said reed switch.

9. A system as claimed in claim 8, and further including second plug-in outlets of a fixed voltage differing from that of said first named outlets.

10. A system as claimed in claim 6, and further including a fiber terminal block having an eyelet terminal and three additional terminals, electrical circuit wiring being pre-connected and installed on said terminal block, and the circuit eyelet being connected to the alternator, the alternator, battery, neutral terminal and regulator being respectively connected in circuit to said pre-established terminals on said terminal block.

* * * * *